(12) United States Patent
Stenberg et al.

(10) Patent No.: US 9,885,870 B2
(45) Date of Patent: Feb. 6, 2018

(54) DIFFRACTIVE OPTICAL ELEMENTS WITH ANALOG MODULATIONS AND SWITCHING

(71) Applicants: Petri Antero Stenberg, Niittylahti (FI); Tuomas Heikki Sakari Vallius, Espoo (FI)

(72) Inventors: Petri Antero Stenberg, Niittylahti (FI); Tuomas Heikki Sakari Vallius, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/137,185

(22) Filed: Apr. 25, 2016

(65) Prior Publication Data

US 2017/0307887 A1    Oct. 26, 2017

(51) Int. Cl.
| | | |
|---|---|---|
| *G02B 5/18* | (2006.01) | |
| *G02B 27/01* | (2006.01) | |
| *G02F 1/01* | (2006.01) | |
| *G02F 1/13* | (2006.01) | |
| *G02F 1/1333* | (2006.01) | |

(Continued)

(52) U.S. Cl.
CPC ....... *G02B 27/0172* (2013.01); *G02B 5/1823* (2013.01); *G02B 5/1857* (2013.01); *G02B 6/0016* (2013.01); *G02B 6/0043* (2013.01); *G02B 27/4205* (2013.01); *G02F 1/011* (2013.01); *G02F 1/1326* (2013.01); *G02F 1/133345* (2013.01)

(58) Field of Classification Search
CPC ... G02B 27/0172; G02F 1/011; G02F 1/1326; G02F 1/133345

USPC ....... 359/237, 238, 240, 245, 558, 563, 566, 359/630, 632
See application file for complete search history.

(56) References Cited

U.S. PATENT DOCUMENTS

| 4,006,963 A | 2/1977 | Baues et al. |
|---|---|---|
| 5,299,289 A | 3/1994 | Omae et al. |

(Continued)

FOREIGN PATENT DOCUMENTS

| WO | 2000028369 A2 | 5/2000 |
|---|---|---|
| WO | 2014091200 A1 | 6/2014 |
| WO | 2014091204 A1 | 6/2014 |

OTHER PUBLICATIONS

Nys, et al., "Switchable 3D Liquid Crystal Grating Generated by Periodic Photo-Alignment on Both Substrates", In Journal of Soft Matter, vol. 11, Issue 39, Aug. 24, 2015, 5 pages.

(Continued)

*Primary Examiner* — Tuyen Tra
(74) *Attorney, Agent, or Firm* — Arent Fox LLP

(57) ABSTRACT

A waveguide configured for use with a near eye display (NED) device can include a light-transmissive substrate configured to propagate light rays through total internal reflection and a switchable diffractive optical element (DOE) on a surface of the substrate that is configured to input and/or output light rays to and/or from the substrate. According to some embodiments, the switchable DOE can include diffractive properties that vary across an area of the DOE. In some embodiments, the switchable DOE includes a surface relief diffraction grating (SRG) a surface of the substrate, a layer of liquid crystal material in contact with the SRG, a layer of conducting material in contact with the liquid crystal material configured to apply the voltage to the liquid crystal material, and a layer of insulating material over the layer of conducting material.

21 Claims, 12 Drawing Sheets

(51) Int. Cl.
*F21V 8/00* (2006.01)
*G02B 27/42* (2006.01)

(56) References Cited

U.S. PATENT DOCUMENTS

| | | |
|---|---|---|
| 5,504,772 A | 4/1996 | Deacon et al. |
| 5,937,115 A | 8/1999 | Domash |
| 6,211,976 B1 | 4/2001 | Popovich et al. |
| 7,625,674 B2 | 12/2009 | Sharma et al. |
| 8,885,112 B2 | 11/2014 | Popovich et al. |
| 2013/0202246 A1 | 8/2013 | Meade et al. |
| 2013/0257848 A1 | 10/2013 | Westerinen et al. |
| 2014/0140654 A1 | 5/2014 | Brown et al. |
| 2015/0125109 A1 | 5/2015 | Robbins et al. |
| 2015/0160529 A1 | 6/2015 | Popovich et al. |
| 2016/0091775 A1 | 3/2016 | Gibson et al. |

OTHER PUBLICATIONS

"International Search Report and Written Opinion Issued in PCT Application No. PCT/US2017/028022", dated Oct. 11, 2017, 14 Pages.

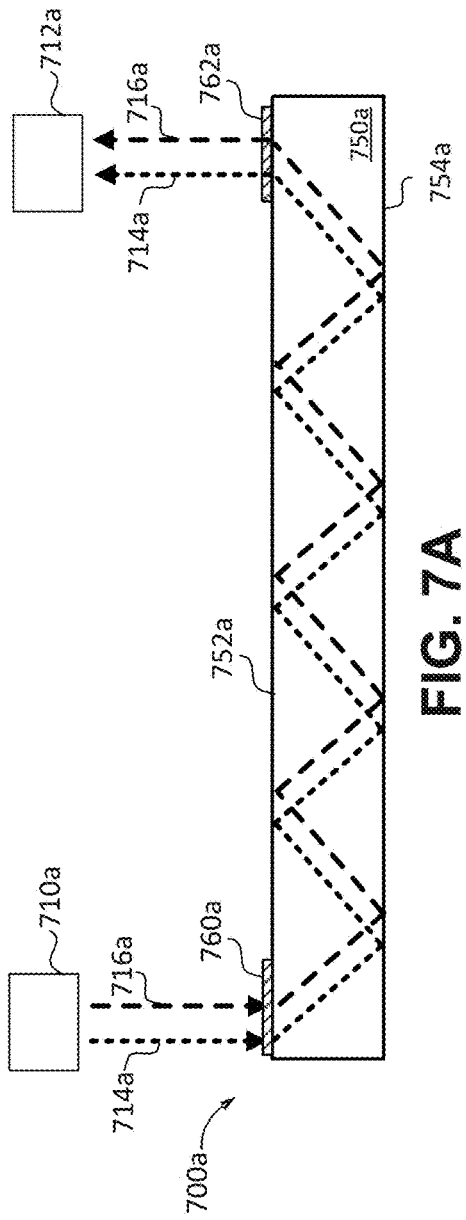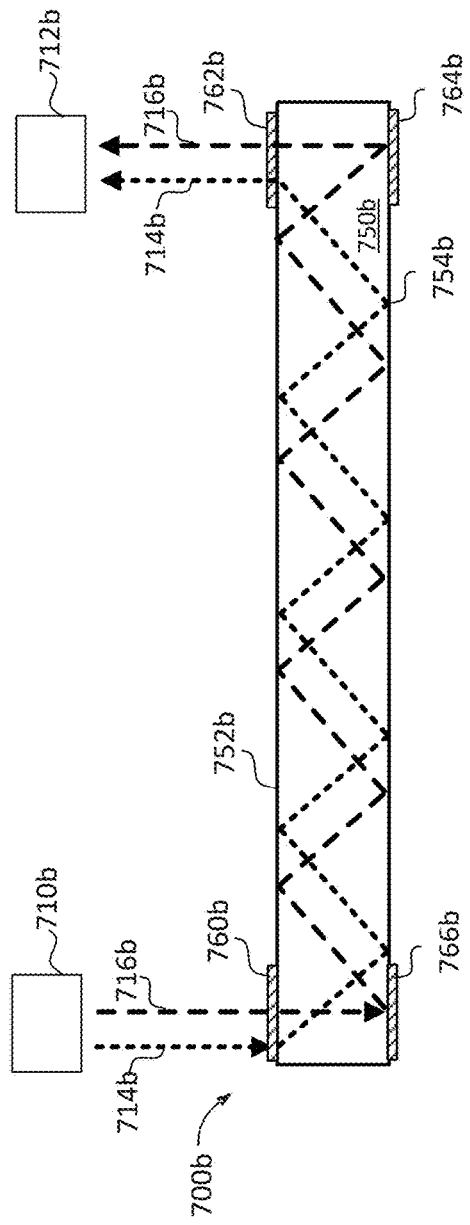

DIFFRACTIVE OPTICAL ELEMENTS WITH ANALOG MODULATIONS AND SWITCHING

BACKGROUND

Display technology is advancing in the areas of augmented reality (AR) and virtual reality (VR) to provide users with more immersive visual experiences. For example, in some AR applications, generated imagery is displayed to a user via a transparent display that also allows the user to view the surrounding physical environment. The generated imagery enhances or augments the user's experience or knowledge of the surrounding physical environment.

In some implementations an optical waveguide can be used to spatially translate a generated image from one position to another position in an optical system. For example, in a near-eye display (NED) device, an optical waveguide can spatially translate propagating light rays representing imagery generated by a microdisplay and convey them toward an eye of a user. Such technology may be incorporated into an NED device in the form of eyeglasses, goggles, a helmet, a visor, or some other type of eyewear.

SUMMARY

The technique introduced here includes an optical waveguide and a method of manufacturing such a waveguide and an optical waveguide display. In various embodiments the optical waveguide can include a light-transmissive substrate configured for use in a near-eye display (NED) device. The substrate can include a plurality of internally reflective surfaces configured to propagate light rays by total internal reflection. The optical waveguide can further include a switchable diffractive optical element (DOE) on a first surface of the plurality of surfaces of the substrate where the switchable DOE is configured to input light rays to the substrate or output light rays from the substrate and where the switchable DOE has diffractive properties that vary across is area. In some embodiments, the switchable DOE includes a surface relief diffraction grating (SRG) on the first surface of the substrate, a layer of liquid crystal material in contact with the SRG, a layer of conducting material in contact with the liquid crystal material configured to apply the voltage to the liquid crystal material, and a layer of insulating material over the layer of conducting material. Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

FIG. 7A illustrates a waveguide pupil relay that includes diffractive optical elements (DOEs) according to a first embodiment.

FIG. 7B illustrates a waveguide pupil relay that includes DOEs according to a second embodiment.

DETAILED DESCRIPTION

Figure 1:
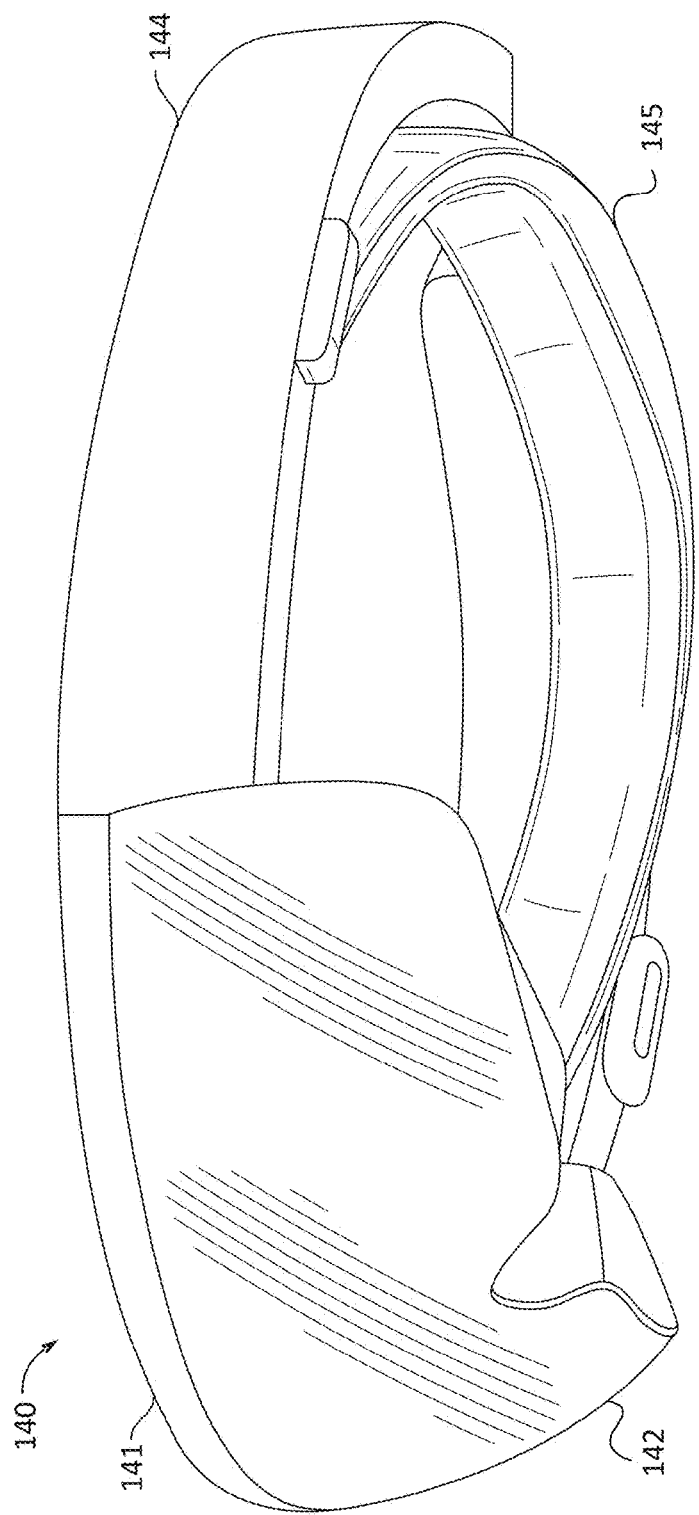
FIG. 1 shows an example of a near-eye display (NED) device in which the technique introduced here can be incorporated.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The following description generally assumes that a "user" of a display device is a human. Note, however, that a display device according to the embodiments disclosed herein can potentially be used by a user that is not human, such as a machine or an animal. Hence, the term "user" can refer to any of those possibilities, except as may be otherwise stated or evident from the context. Further, except where stated otherwise, the term "eye" is used herein as a general term to refer to an optical receptor of any type of user of a display device, and therefore can refer to a human eye, an animal eye, or a machine-implemented optical sensor designed to detect an image in a manner analogous to a human eye.

Some NED devices include optical systems for spatially translating a pupil from one position to another position, for example from a microdisplay imager to an eye of a user. This optical system is sometimes referred to as a pupil relay system. An NED device can include one or more transparent waveguides arranged so that they are located directly in front of each eye of the user when the NED device is worn by the user, to project light representing generated images into the eye of the user. With such a configuration, images generated by the NED device can be overlaid on the user's view of the surrounding physical environment. Waveguides configured for use in NED devices include reflective surfaces configured to propagate light rays through total internal reflection (TIR). One aspect of translating a pupil from one position to another via a waveguide involves receiving the light rays into the waveguide ("in-coupling") at a first location and outputting the light rays from the waveguide ("out-coupling") at a second location.

In some embodiments light rays are in-coupled and out-coupled from the waveguide via a diffractive optical element (DOE) that functions as an input port or an output port for the light rays. A DOE can include a diffraction grating structure, for example a surface relief diffraction grating (SRG). Some display applications require a switchable diffraction grating structure that is configured for switching between an active diffraction state and a passive transparent state. For example, a waveguide or multiple waveguides may include multiple switchable DOEs, each configured for in-coupling and/or out-coupling light rays at a specific wavelength. In such applications, the ability to switch between states provides design flexibility to selectively in-couple and/or out-couple the light at the specific wavelength at any given time. As another example, a waveguide or multiple waveguides may include multiple switchable DOEs, each configured for in-coupling and/or out-coupling light rays at particular angle of incidence. In these applications, the ability to switch between states would allow for multiplexing of in-coupling and/or out-coupling of multiple segments of an overall field of view (FOV) where each switchable DOE inputs and/or outputs light rays associated with a segment of the overall field of view.

One solution for implementing a switchable DOE is a liquid crystal-based switchable grating structure, for example a Switchable Bragg Grating (SBG). An SBG provides the ability to switch a grating structure between an active diffraction state and a passive transparent state. However, SBGs have a number of drawbacks, including that they do not allow for variations in the grating structure. In the context of waveguides used for NED devices this is a significant limitation. Use of an SBG is sometimes not feasible for many NED applications because an SBG cannot be optimized, for example, by tuning the phase of the diffracted light, angular response as a function of the location, or spatially changing the diffraction efficiency. A diffraction grating properly optimized for use with a waveguide display of an NED often requires that variation in one or more physical parameters of the grating structure, such as linewidth, period, fill factor, line angle (slant), grating depth, modulation direction, and grating line shape.

Introduced here are embodiments of a solution to this problem that include filling a replicated grating structure (with variation across its area) with liquid crystal material to create a DOE with analog modulations and switching. In such embodiments, variations in the replicated grating structure allow for design flexibility in the diffractive properties of the DOE. With the introduction of liquid crustal material, the resulting DOE is can be switched between a diffractive state and a transparent state through the application of an electrical potential to the liquid crystal material.

FIG. 1 shows an example of a near-eye display (NED) device in which the technique introduced here can be incorporated. The NED device 140 may provide virtual reality (VR) and/or augmented reality (AR) display modes for a user, i.e., the wearer of the device. To facilitate description, it is henceforth assumed that the NED device 140 is designed for AR visualization.

In the illustrated embodiment, the NED device 140 includes a chassis 141, a transparent protective visor 142 mounted to the chassis 141, and left and right side arms 144 mounted to the chassis 141. The visor 142 forms a protective enclosure for various display elements (not shown) that are discussed below.

The chassis 141 is the mounting structure for the visor 142 and side arms 144, as well as for various sensors and other components (not shown) that are not germane to this description. A display assembly (not shown) that can generate images for AR visualization is also mounted to the chassis 141 and enclosed within the protective visor 142. The visor assembly 142 and/or chassis 141 may also house electronics (not shown) to control the functionality of the display assembly and other functions of the NED device 40. The NED device 140 shown in FIG. 1 is configured as a head-mounted display HMD device and so further includes an adjustable headband 145 attached to the chassis 141, by which the NED device 140 can be worn on a user's head.

Figure 2A:
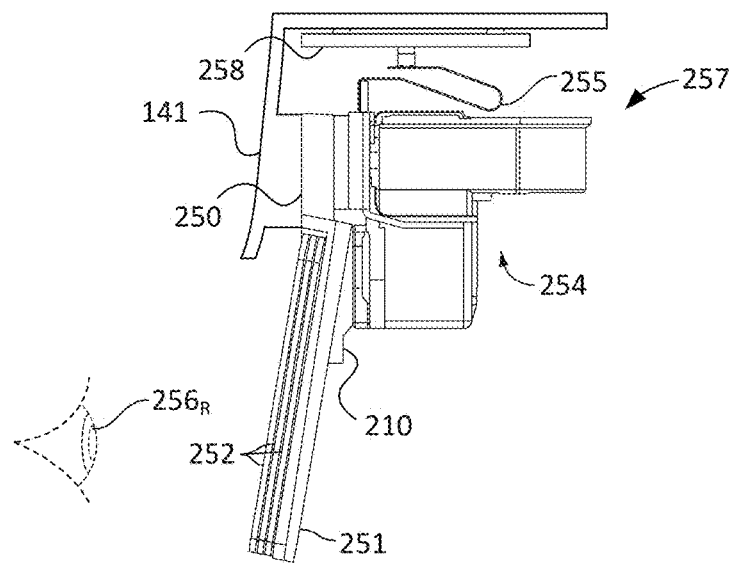
FIG. 2A shows a right side view of display components that may be contained within the NED device of FIG. 1.
Figure 2B:
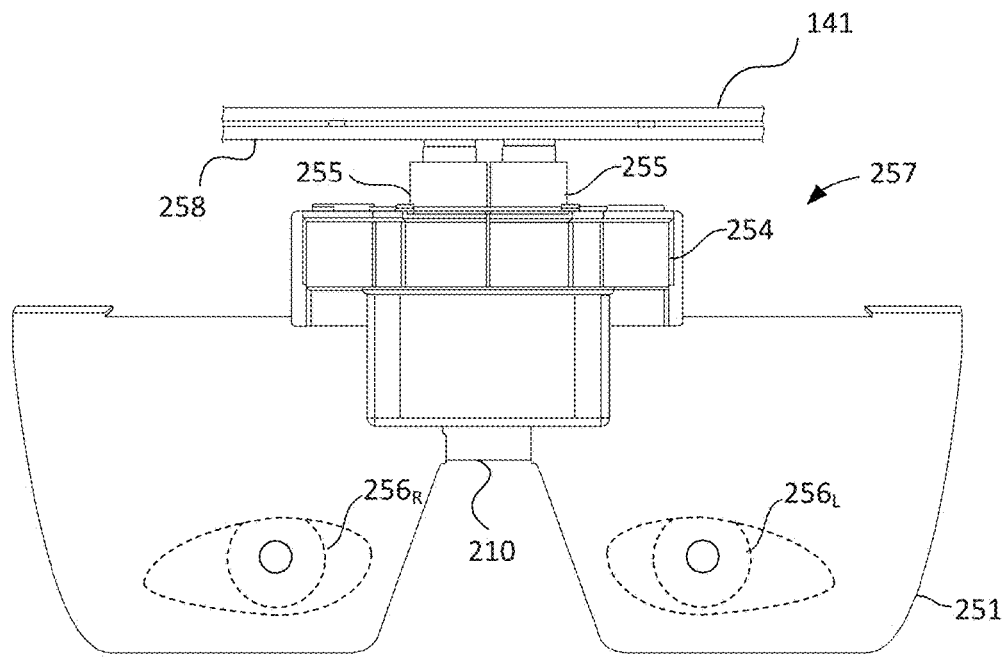
FIG. 2B shows a front view of display components that may be contained within the NED device of FIG. 1.

FIGS. 2A and 2B show, in accordance with certain embodiments, right side and front orthogonal views, respectively, of display components that may be contained within the visor 142 of the NED device 140. During operation of the NED device 140, the display components are positioned relative to the user's left eye $256_L$ and right eye $256_R$ as shown. The display components are mounted to the interior surface of the chassis 141. The chassis 141 is shown in cross-section in FIG. 2A.

The display components are designed to overlay three-dimensional images on the user's view of his real-world environment, e.g., by projecting light into the user's eyes. Accordingly, the display components include a display module 254 that houses a light engine including components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters and/or waveguides. The microdisplay imager(s) (not shown) within the display module 254 may be connected via a flexible circuit connector 255 to a printed circuit board 258 that has image generation/control electronics (not shown) mounted on it.

The display components further include a transparent waveguide carrier 251 to which the display module 254 is mounted, and one or more transparent waveguides 252 stacked on the user's side of the waveguide carrier 251, for each of the left eye and right eye of the user. The waveguide carrier 251 has a central nose bridge portion 210, from which its left and right waveguide mounting surfaces extend. One or more waveguides 252 are stacked on each of the left and right waveguide mounting surfaces of the waveguide carrier 251, to project light emitted from the display module and representing images into the left eye $256_L$ and right eye $256_R$, respectively, of the user. The display assembly 257 can be mounted to the chassis 141 through a center tab 250 located at the top of the waveguide carrier 251 over the central nose bridge section 210.

Figure 3A:
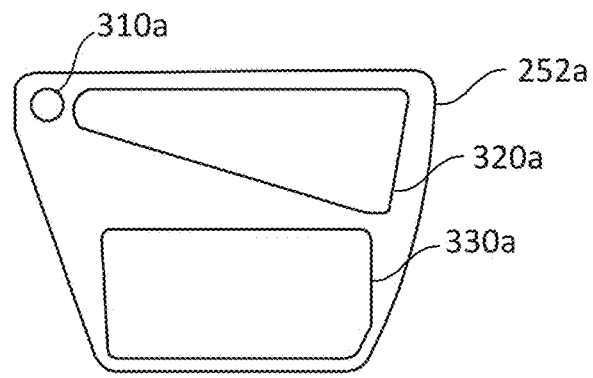
FIG. 3A shows an example waveguide with a single input and single output configured to convey light to an eye of a user of the NED device of FIG. 1.

FIG. 3A shows a single input pupil design for a waveguide 252a that can be mounted on the waveguide carrier 251 to convey light to a particular eye of the user, in this example, the right eye of user. A similar waveguide can be designed for the left eye, for example, as a (horizontal) mirror image of the waveguide shown in FIG. 3A. The waveguide 252*a* is transparent and, as can be seen from FIGS. 2A and 2B, would normally be disposed directly in front of the right eye of the user during operation of the NED device, e.g., as one of the waveguides 252 in FIG. 2A. The waveguide 252*a* is, therefore, shown from the user's perspective during operation of the NED device 140.

The waveguide 252*a* includes a single input port 310*a* (also called an in-coupling element, and corresponding to the single input pupil) located in the region of the waveguide 252*a* that is closest to the user's nose bridge when the NED device 140 is worn by the user. In certain embodiments the input port 310*a* is or includes a DOE which can include, for example a surface diffraction grating, volume diffraction grating, and/or a switchable diffraction grating. The waveguide 252*a* further includes an output port 330*a* (also called out-coupling element) and a transmission channel 320*a*. As with the input port 310*a*, in certain embodiments, the output port 330*a* is or includes a DOE which can include, for example a surface diffraction grating, volume diffraction grating, and/or a switchable diffraction grating. A right-eye output port of the display module (not shown) is optically coupled (but not necessarily physically coupled) to the input port 310*a* of the waveguide 310. During operation, the display module 252 (not shown in FIG. 3) outputs light representing an image for the right eye from its right-eye output port (not shown) into the input port 310*a* of the waveguide 252*a*.

The transmission channel 320*a* conveys light from the input port 311 to the output port 313 and may include, for example, a surface diffraction grating, volume diffraction grating, or a reflective component such as a substrate with multiple internally reflective surfaces. The transmission channel 320*a* may be designed to accomplish this by use of total internal reflection (TIR). Light representing the image for the right eye is then projected from the output port 330*a* to the user's eye.

Figure 3B:
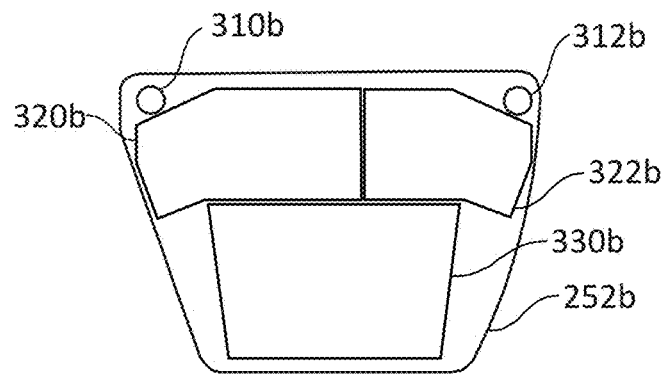
FIG. 3B shows an example waveguide with multiple inputs and single output configured to convey light to an eye of a user of the NED device of FIG. 1.

As shown in FIG. 3B, in some embodiments a waveguide may include multiple input ports 310*b* and 312*b*, for example to provide a greater overall field of view (FOV) through multiplexing different fields of view of the projected image. Note that while the present disclosure describes waveguides with one or two input ports/pupils and a single output port/pupil, a display device incorporating the technique introduced here may have a waveguide with more than two input ports/pupils and/or more than one output port/pupil for a given eye. Further, while the example of FIG. 3B is for the right eye, a similar waveguide can be designed for the left eye, for example, as a (horizontal) mirror image of the waveguide in FIG. 3B.

As shown in FIG. 3B, the waveguide 252*b* includes two separate input ports 310*b* and 312*b*, two transmission channels 320*b* and 322*b*, and an output port 330*b*. During operation, each of the input ports 310*b*, 312*b* receives light (from the display module 254) representing a different portion of the image for the right eye of the user. Each of the transmission channels 320*b*, 322*b* is optically coupled to a separate one of the input ports 310*b* or 312*b* and conveys light from only the corresponding input port 310*b* or 312*b* to the output port 330*b*. Each of the transmission channels 320*b*, 322*b* may be, for example, an internal or surface diffraction grating design to channel light by TIR. Light from the two different portions of the image is combined at the output port 330*b* and projected into the eye of the user as a single integrated image.

In some embodiments, the left input port 310*b* receives the left portion (e.g., half) of the image for one eye of the user (e.g., the right eye) while the right input port 312*b* receives the right portion (e.g., half) of the image for that same eye. Each portion of the image can include all of the color components that are present in the complete image, e.g., red, green and blue color components. The portions of the image may be generated in a tiled manner, i.e., where they are spatially contiguous and non-overlapping, or they may at least partially overlap spatially. Further, in other embodiments, rather than generating left and right portions of the image, the separate portions of the image could be upper and lower portions of the image, or the image could be spatially divided in some other manner. Additionally, the waveguide 252*b* could have more than two input ports, in which case the image could be provided to the waveguide 252*b* in the form of three or more separate image portions, which are reintegrated in the waveguide 252*b*.

Hence, in at least some embodiments, different portions of an image for a given eye of the user are generated and input simultaneously into separate input ports of a waveguide, then reintegrated within the waveguide and projected into the eye of the user as a single integrated image, to produce a larger FOV. In other embodiments, the separate portions of the image could be input to the waveguide in a time division multiplexed manner, rather than simultaneously. Further, in some embodiments, the physical placement of the input ports on the waveguide may be different from that shown in FIG. 3B. For example, the input ports could be spaced apart vertically on the waveguide rather than, or in addition to, horizontally. Other input port configurations are also possible.

Figure 3C:
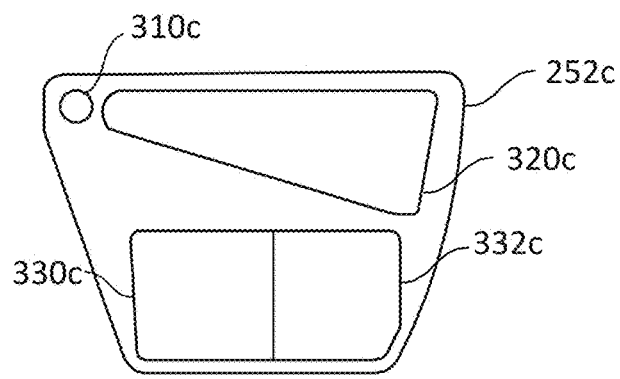
FIG. 3C shows an example waveguide with a single input and multiple outputs configured to convey light to an eye of a user of the NED device of FIG. 1.

As shown in FIG. 3C, in some embodiments a waveguide may include multiple output ports 330*c* and 332*c*, for example to provide a greater overall field of view (FOV) through multiplexing different fields of view of the projected image. Note that while the present disclosure describes a waveguides with two output ports/pupils and a single input port/pupil, a display device incorporating the technique introduced here may have a waveguide with more than two input ports/pupils and/or more than two output ports/pupils for a given eye. Further, while the example of FIG. 3C is for the right eye, a similar waveguide can be designed for the left eye, for example, as a (horizontal) mirror image of the waveguide in FIG. 3C.

As shown in FIG. 3C, the waveguide 252*c* includes two separate output ports 330*c* and 332*c*, a transmission channel 320*c*, and an input port 310*c*. During operation, the input ports 310*c* receives light (from the display module 254) representing a different portion of the image for the right eye of the user. The transmission channel 320*c* is optically coupled to the input ports 310*c* and conveys light from the input port 310*c* or the output ports 330*c* and 332*c*. The transmission channels 320*c* may be, for example, an internal or surface diffraction grating design to channel light by TIR. Each of the two output ports 330*c* and 332*c* output light corresponding to one of two different portions of an image and project the respective protons of the image into the eye of the user as a single integrated image.

In some embodiments, the left output port 330*c* projects the left portion (e.g., half) of the image for one eye of the user (e.g., the right eye) while the right output port 332*c* projects the right portion (e.g., half) of the image for that same eye. Each portion of the image can include all of the color components that are present in the complete image, e.g., red, green and blue color components. The portions of the image may be generated in a tiled manner, i.e., where they are spatially contiguous and non-overlapping, or they may at least partially overlap spatially. Further, in other embodiments, rather than generating left and right portions of the image, the separate portions of the image could be upper and lower portions of the image, or the image could be spatially divided in some other manner. Additionally, the waveguide 252c could have more than two output ports, in which case the image can be projected to the eye of the user in the form of three or more separate image portions Hence, in at least some embodiments, different portions of an image for a given eye of the user are generated and input simultaneously into separate input ports of a waveguide, then reintegrated within the waveguide and projected into the eye of the user as a single integrated image, to produce a larger FOV. In other embodiments, the separate portions of the image could be input to the waveguide in a time division multiplexed manner, rather than simultaneously. Further, in some embodiments, the physical placement of the input ports on the waveguide may be different from that shown in FIG. 3C. For example, the input ports could be spaced apart vertically on the waveguide rather than, or in addition to, horizontally. Alternatively, in some embodiments, the multiple output ports of a waveguide may be overlaid over one another instead of oriented side by side as shown in FIG. 3C. Other input port configurations are also possible.

Figure 4:
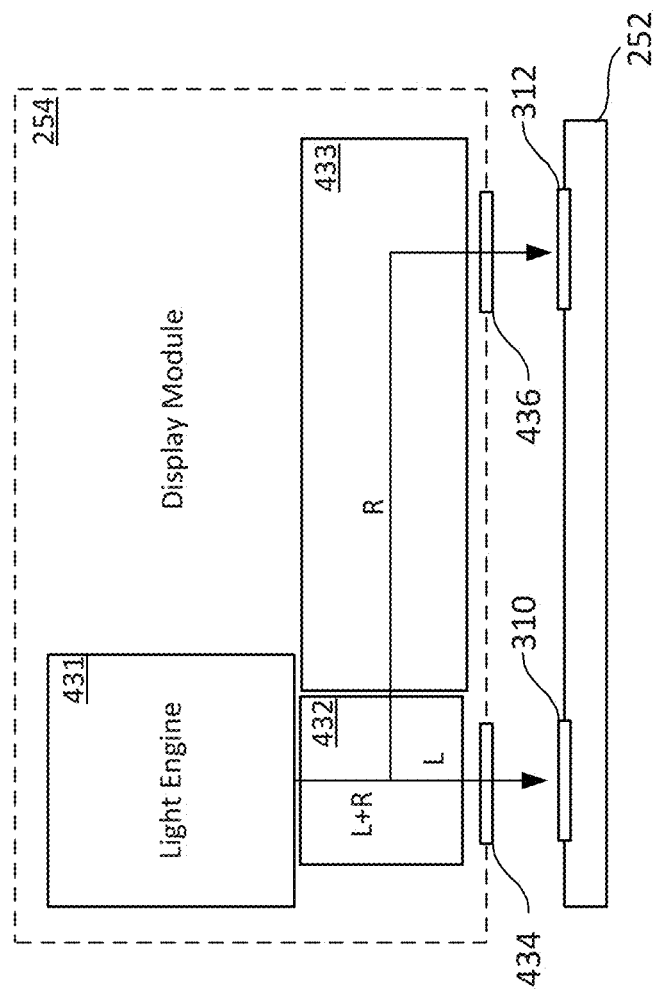
FIG. 4 is a schematic diagram that shows the components of an example display module that may be contained within the NED device of FIG. 1.

FIG. 4 schematically shows an example display module 254 configured for use with a NED device such as NED 140 in FIGS. 2A-2B. Note, that example display module 254 shown in FIG. 4 is configured for use with a dual input port waveguide as shown at example waveguide 252b in FIG. 3B. However, similar principles can be applied for a display module configured for use with fewer or more input ports, for example as shown at example waveguides 252a and 252c in FIGS. 3A and 3C (respectively).

As shown in FIG. 4, example display module 254 includes a light engine 431, an optical switch 432 and a pupil relay 433. Though not shown, the display module 254 may also include similar or identical components for the other eye of the user. In some embodiments, the light engine 431 includes one or more light sources (not shown), such as one or more colored LEDs. For example, the light engine 431 can include red, green and blue LEDs to produce the red, green and blue color components, respectively, of the image. Additionally, the light engine 431 includes at least one microdisplay imager (not shown), such as an LCOS imager, LCD or DMD; and may further include one or more lenses, beam splitters, waveguides, and/or other optical components (not shown).

The optical switch 432 controls the propagation direction of the light output by the light engine 431, representing each particular portion of the image, to one of two different optical paths. In the illustrated embodiment, the first path is for the left half of the image and leads to an output port 434 of the display module 254 that is coupled to one corresponding input port 310 of the waveguide 252. The other optical path is for the right portion of the image and includes a pupil relay 433, which propagates that portion of the image to a second output port 436 of the display module 54, which is optically coupled to a second corresponding input port 312 of the waveguide 252.

The optical switch 432 selectively controls the propagation direction of light from the light engine 431 based on a switching criterion, such as polarization. For example, one half of the image may have s-polarization while the other half of image has p-polarization, where the optical switch 432 conveys s-polarized light along one optical path and conveys p-polarized light along the other optical path. The switch 432 can be, for example, an LCD mirror that either transmits light or acts as a perfect mirror, depending on the applied voltage. Note, however, that a switching criterion (or criteria) other than polarization could be used. For example, time division multiplexing could be used to switch between the optical paths. The optical switch 432, therefore, enables a single light engine 431 to provide two pupils for an image to two separate in-coupling elements 310, 312 on a waveguide 252. In an example waveguide with only one input port, optical switch 432 may direct light emitted from light engine 431 to the single input port.

The pupil relay 433 is optional but enables larger distances between the input ports 310, 312 on the waveguide 252. The pupil relay 433 may be constructed using any known or convenient method and materials for transferring an image pupil from one location to another. For example, the pupil relay 433 may be constructed from a sequence of paraxial lenses that focus the pupil to an intermediate image and then collimate it, followed by a mirror to redirect the light into the corresponding input port of the waveguide.

Figure 5:
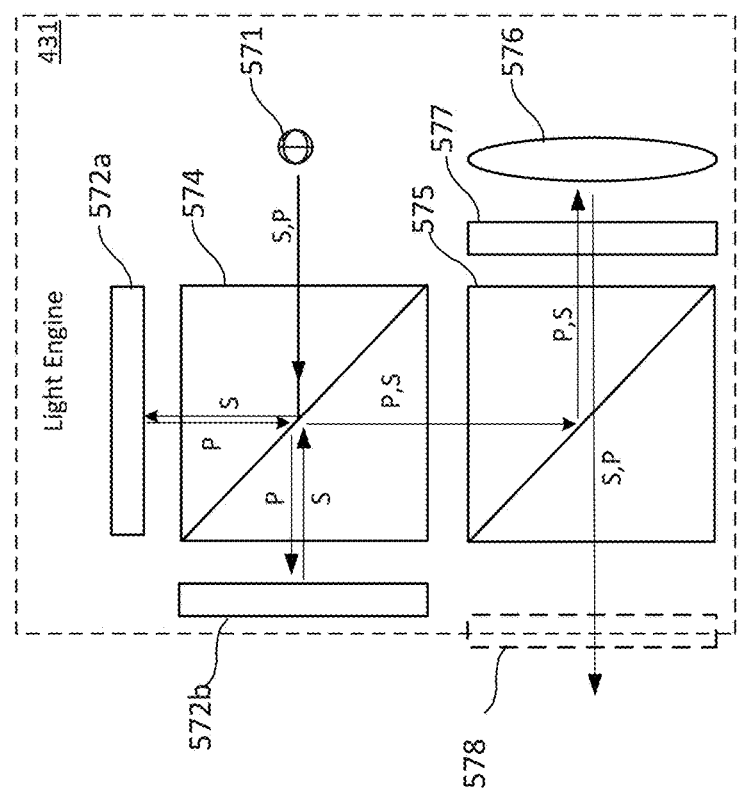
FIG. 5 is a schematic diagram that shows the components of an example light engine configured for use with the display module of FIG. 4.

FIG. 5 schematically illustrates an example light engine 431 including certain relevant components. The view in FIG. 5 is from the right side of the display module 254. Note that some embodiments may include other active and/or passive components, not shown. The light engine 431 in the illustrated embodiment includes at least one light source 571, such as a color LED. Although only one light source 571 is shown in FIG. 5, in practice there may be multiple light sources provided for each eye of the user, e.g., one for each color component of whatever color model is being employed (e.g., red, green and blue). The same or a similar configuration as shown in FIG. 5 can be used to combine light from such multiple light sources.

The light engine 431 further includes one or more imagers (e.g., LCOS microdisplays) 572a and 572b that generate an image intended for display to a particular eye of the user. Note that the example light engine 431 shown in FIG. 5 includes two imagers 572a and 572b, however another light engine may include one or more than two imagers. In the case of multiple imagers 572a and 572b, each imager may generate a portion of the image to be displayed to the user. A retarder (e.g., quarter-wave plate) can be placed before the waveguide at one of the waveguide inputs to have optimum polarization entering the waveguide.

Additionally, the light engine 431 can include a combination of polarizing beam splitters (PBSs) 574, 575, one or more reflective lenses 576 and one or more quarter-wave plates 577, that generate and propagate the image(s) through the output port 578 of the light engine 431. In the example shown in FIG. 5, a first PBS 574 reflects s-polarized light from the light source 571 upward to a first microdisplay imager 572a, which generates one portion of the image. The PBS 574 also causes p-polarized light from the light source 571 to be propagated straight through to the other microdisplay imager 572b, which produces a second portion of the image. Both portions of the image (separately constituting s-polarized and p-polarized light) then propagate downward through the PBS 574 to a second PBS 575, which directs them to birdbath-shaped reflective lenses 76 via quarter-wave plates (retarders) 577. The image portions are then reflected back by the reflective lenses 576 through the quarter-wave plates 577 and then through the PBS 75. From there, the image portions are output through the output port 578 of the light engine 431 and provided to additional optics in the display module 254, as shown by the example in FIG. 4.

Figure 6:
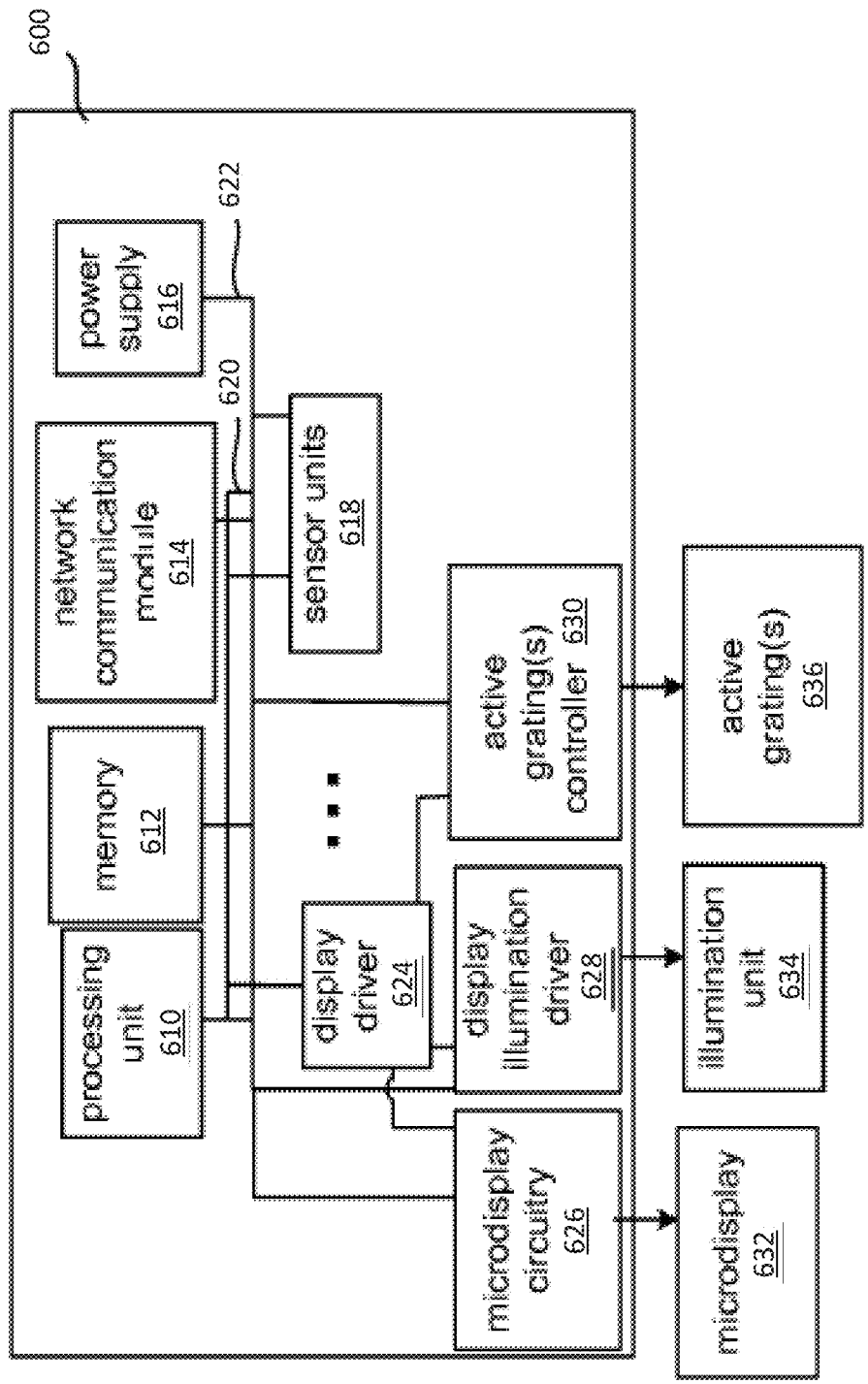
FIG. 6 is a block diagram of example hardware components including a computer system within control circuitry of the NED device of FIG. 1.

FIG. 6 is a block diagram of example hardware components including a computer system within control circuitry 600 of a NED device 140. In reference to the components shown in FIGS. 2A and 2B, at least some of the elements of control circuitry 600 can be implemented on the printed circuit board 258. Control circuitry 600 provides various electronics that support the other components of NED device 140. In this example, the control circuitry 600 includes a processing unit 610, a memory 612 accessible to the processing unit 610 for storing processor readable instructions and data, a communication module 614 communicatively coupled to the processing unit 610 which can act as a network interface for connecting the NED device to another computer system. A power supply 616 provides power for the components of the control circuitry 600 and the other components of the NED device 140 like sensor units 618 which may include, but are not limited to, image capture devices (e.g. cameras), audio capture devices (e.g. microphones), and location/motion capture devices (e.g. accelerometers).

The processing unit 610 may include one or more processors including a central processing unit (CPU) and/or a graphics processing unit (GPU). Memory 612 is representative of the various types of memory which may be used by the system such as random access memory (RAM) for application use during execution, buffers for sensor data including captured image data and display data, read only memory (ROM) or Flash for instructions and system data, and other types of nonvolatile memory for storing other items, some examples of which are applications for which image light representing image data is generated. In this example, an electrical connection of a data bus 620 connects the sensor units 618, a display driver 624, processing unit 610, memory 612, and the communication module 614. The data bus 620 also derives power from the power supply 616 through a power bus 622 to which all the illustrated elements of the control circuitry are connected for drawing power.

The control circuitry 600 further includes the display driver 624 for selecting digital control data, e.g. control bits, to represent image data which digital control data may be decoded by microdisplay circuitry 626 and different active component drivers. An example of an active component driver is a display illumination driver 628 which converts digital control data to analog signals for driving an illumination unit 634 which includes one or more light sources (e.g. similar to light source 571 in FIG. 5) like one or more light emitting diodes (LEDs). A microdisplay 632 may be an active transmissive, emissive, or reflective device. For example, microdisplay 632 may be similar to the one or more imagers 572a-b described with reference to FIG. 5. Microdisplay 632 may be a liquid crystal on silicon (LCoS) device requiring power or a micromechanical machine (MEMs) based device requiring power to move individual mirrors. In some embodiments, a waveguide display may include one or more active gratings 636 such as an SBG. An active grating(s) controller 630 converts digital control data into signals for changing the properties of one or more active gratings 636. In reference to the components shown in FIGS. 2A and 2B, the microdisplay 632 and illumination unit 634 can be implemented in the display assembly 257.

In some embodiments discussed below, the control circuitry 600 may include other control units not illustrated here but related to other functions of a NED device 140 device such as, for example, polarization control, providing audio output, identifying head orientation and location information. In other embodiments, some of the processing and memory resources identified in FIG. 6 can be shared between the control circuitry 600 and a companion processing module embodied in, for example, a mobile device (e.g. a smart phone) communicatively coupled to the NED device 140.

FIGS. 7A and 7B illustrate the propagation of light rays in a pupil relay using DOEs on a waveguide substrate. The term "pupil relay" describes the system of components used to spatially transfer a pupil from on location to another, for example from entry pupil 710a-b to exit pupil 712a-b. In some embodiments, the pupil relay includes a waveguide with optical properties such that the entry pupil and exit pupil of the waveguide have substantially identical size and shape, and such that polychromatic light rays input to the pupil relay propagate collinearly through the pupil relay by total internal reflection (TIR), so that the corresponding output light rays have substantially identical chromatic properties to those of the input light rays; that is, the pupil relay is achromatic. In this context, "substantially identical" means that there is no perceivable difference in these properties to a human user. In other embodiments, the optical properties of the entry pupil may differ from the optical properties of the exit pupil, for example, for pupil expansion.

As shown in FIG. 7A, in some embodiments, a pupil relay is a waveguide 700a that includes a light-transmissive substrate 750a with at least two surfaces 752a and 754a that are substantially parallel to each other and that are internally reflective so as to provide TIR of light rays propagating within the substrate 133. Waveguide 700a also includes two DOEs 760a and 762a that facilitate light entry and exit from the substrate (one on the input end and one on the output end). In some embodiments, DOEs 760a and 762a are SRGs formed as part of or proximate to a given surface (i.e., a surface parallel to the direction of propagation of the light rays within the substrate) of the substrate 750a of the waveguide 700a. For example, as shown in FIG. 7A, DOEs 760a and 762a may be formed on or proximate to surface 752a of substrate 750a. In this description, "proximate to" means no deeper than one micrometer from the surface. It may be desirable to make the depth of each DOE relatively large compared to its period.

The DOEs 760a and 762a may be designed to cause light rays of different colors to propagate collinearly through the substrate 752a and to continue to propagate collinearly upon exiting the waveguide 700a, respectively. For example, FIG. 7A shows collinear light rays 714a and 716a of two different colors entering substrate 750a via DOE 760a (the in-coupling element), propagating through substrate 750a through TIR, and exiting substrate 750a at DOE 762a (the out-coupling element).

FIG. 7B shows another way of combining multiple colors into a single waveguide by using DOEs. In FIG. 7B, the waveguide 700b includes at least four diffraction DOEs 760b, 762b, 764b, and 766b formed in or proximate to two opposite surfaces 752b and 754b of the substrate 750b that are parallel to the direction of propagation of the light rays within the substrate. The DOEs 760b and 762b on one surface 752b (e.g., top surface) of the waveguide 700b couple a first color (represented by light ray 714b), and the DOEs 764b and 766b on the opposite surface 754b (e.g., bottom surface) of the substrate 750b couple a second color (represented by light ray 716b). This can be done using, for example, DOEs that work only on one polarization (colors have orthogonal polarizations) or using switchable diffraction gratings to enable selection of the coupled color for each diffraction gating. As mentioned above, the same principle can be applied to allow collinear propagation of three or more colors through the pupil relay in the embodiments of FIGS. 7A and 7B.

In the embodiments of FIGS. 7A and 7B, the substrates 750a-b may be formed of material(s) with appropriate optical properties to facilitate light propagation through TIR.

In some embodiments, substrates 750*a-b* are made of glass, for example, formed through an injection molding process. As mentioned, each of the DOEs 760*a-b*, 762*a-b*, 764*b*, and 766*b* may include SRGs that can be part of a surface of the substrate 750*a-b* (e.g. formed through etching into a surface of substrate 750*a-b* or formed during an injection molding process), can be formed on a surface of substrate 750*a-b* (e.g. through application and curing of material on the surface), or can be buried within the substrate 750*a-b*. Hence, the light input surface and light output surface of the waveguide 700*a-b*, respectively, are each a DOE, or a portion of the substrate surface directly over a DOE if the DOE is buried below the surface. It can be assumed that each DOE in the pupil relay is substantially coplanar with at least one of the surfaces of the substrate that are parallel to the long axis of the pupil relay (i.e., each DOE is parallel to such surface and within one micrometer of depth of such surface).

Figure 8:
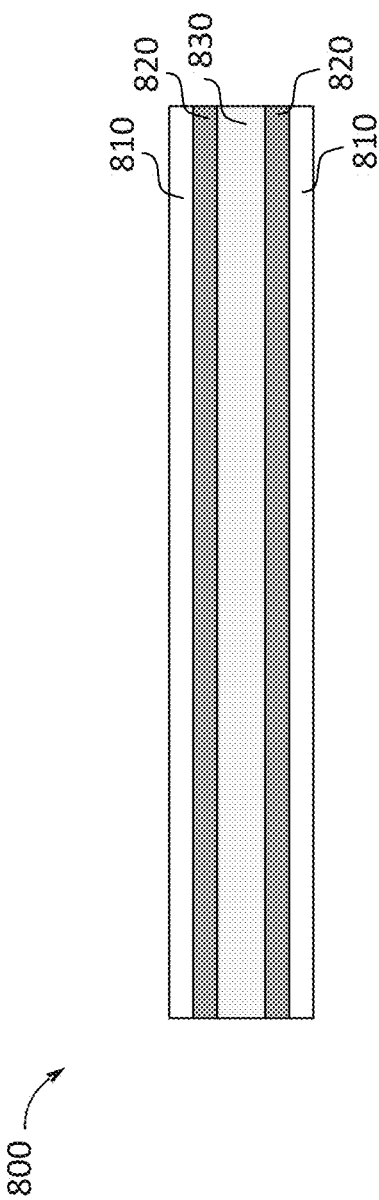
FIG. 8 shows a cross-sectional view of an example switchable DOE.

FIG. 8 shows a cross-sectional view of a SBG 800 that illustrates the basic concept of a liquid crystal-based switchable diffraction grating. Such an SBG may act as a switchable DOE that can be used as an in-coupling port or an out-coupling port for a waveguide substrate, for example a waveguide similar to waveguides 700*a-b* described with reference to FIGS. 7A and 7B. SBG 800 includes a thin layer (e.g. ~2-4 μm thick) 830 of holographic polymer dispersed liquid crystal (HPDLC) mixture which forms the grating structure that is activated and deactivated responsive to electrical control signals. The HPDLC mixture can be a mixture of photopolymerizable monomers and liquid crystal material that have been holographically processed. In contact with the layer of HPDLC is a coating 820 of electrically conductive material through which the electrical control signals can be applied to the layer 830 of HPDLC. For example, coating 820 may be a thin (e.g. ~100 to 200 μm thick) layer of indium tin oxide (ITO) that can function as a transparent electrode, although other suitable materials may also be used. This coating 820 can be in electrical communication with an active grating controller (e.g. controller 636 shown in FIG. 6) to receive switching control signals. Surrounding both the layer 830 of HPDLC and coating 820 are thin (e.g. ~100 to 200 μm thick) layers of transparent insulator 810.

An SBG 800 can be fabricated by first placing a thin film of HPDLC mixture including the photopolymerizable monomers and liquid crystal material between parallel glass plates (e.g. plates 810) that have an applied transparent electrode coating (e.g. coating 820). A thick phase grating is then recorded as a hologram by illuminating the HPDLC mixture with two mutually coherent laser beams, which interfere to form the desired grating structure. During the recording process, the monomers polymerize, and the HPDLC mixture undergoes a phase separation, creating regions densely populated by liquid crystal microdroplets, interspersed with regions of clear polymer. The alternating liquid crystal rich and liquid crystal-depleted regions form fringe planes of the volume grating. The resulting thick phase grating can then be controlled by the magnitude of the electric field applied across the HPDLC layer 830.

In one embodiment, where no electrical field is applied the liquid crystal droplets in the HPDLC layer 830 forms the fringe planes that define the diffraction grating structure. During operation of a waveguide display, an electric field applied to the grating via transparent electrode layer 820 causes the liquid crystal droplets in the HPDLC layer to reorient such that the refractive index of the fringe planes is reduced. This causes the grating diffraction efficiency to drop to very low levels, and the HPDLC layer 830 to appear transparent. The diffraction efficiency of the device can be electronically adjusted over a continuous range, for example from near 100% efficiency in some examples with no voltage applied to essentially zero efficiency with a sufficiently high voltage applied. The materials can also be engineered to work in reverse mode, i.e. to switch on with an applied voltage potential.

Existing switchable diffraction gratings can be configured to achieve high diffraction efficiencies, but have a number of significant drawbacks when used as a DOE for in-coupling and out-coupling light rays for a waveguide of a NED device. Achieving high levels of image uniformity (i.e. avoiding rainbow effects and other color inconsistencies) across a wide field of view in a waveguide display often requires optimizing the grating structure through applying variations in one or more physical parameters of the grating structure. These parameters can include, but are not limited to line width, period, fill factor, line angle (slant), grating depth, modulation direction, and grating line shape. In existing switchable diffraction gratings, the shape, linewidth, and slant angle of the grating lines cannot be modulated (i.e. varied) across the area of the grating structure. Line depth can be modulated to a degree by varying the gap thickness between the glass layers (e.g. layers 810), but this is usually not practical.

Figure 9:
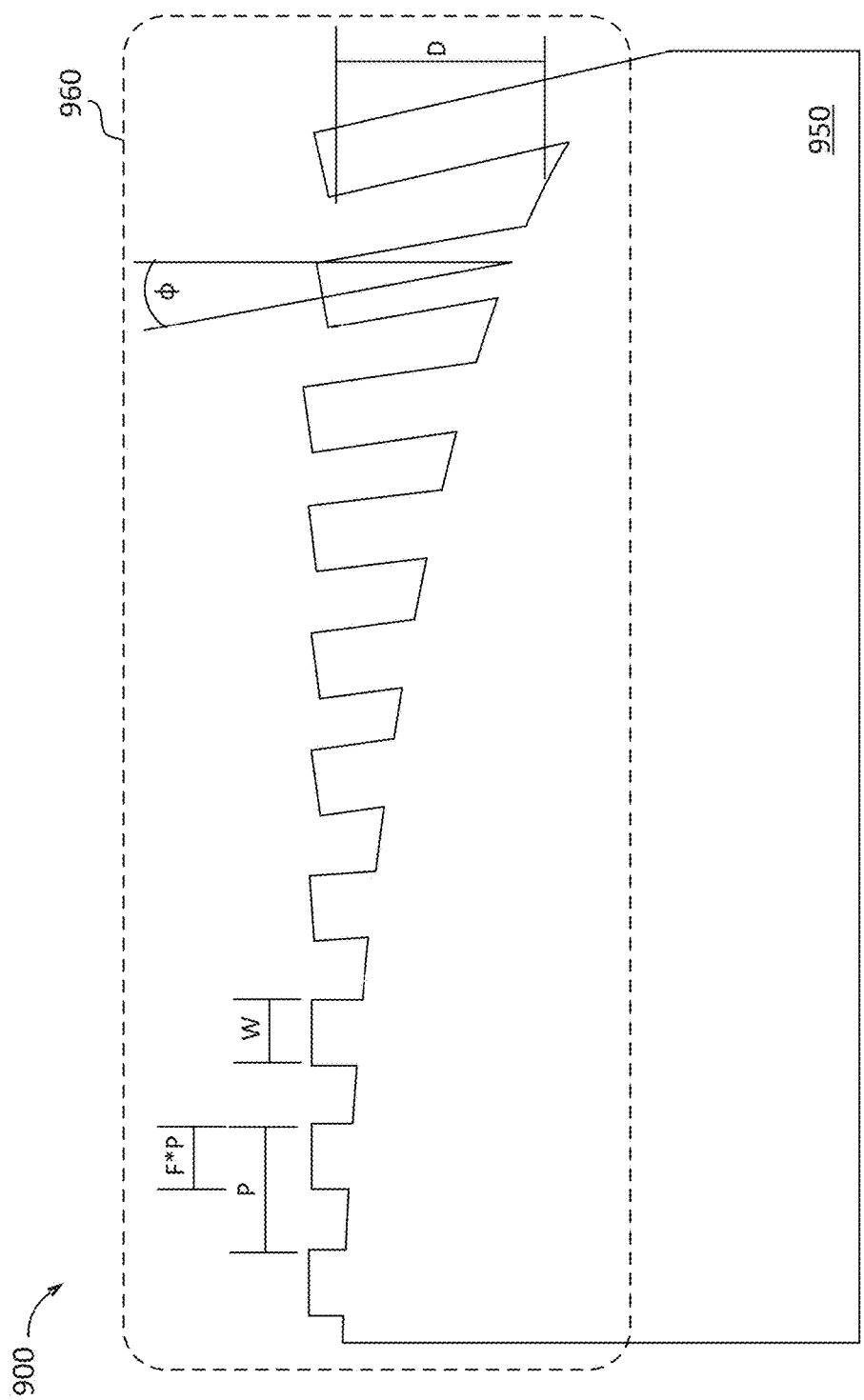
FIG. 9 shows a cross-sectional view of an example waveguide with a DOE that includes surface diffraction gratings with varying structure.

FIG. 9 shows a cross-sectional of an example waveguide 900 including diffraction gratings with varying structure that form a DOE 960 on a substrate 950. Here, waveguide 900 can be considered analogous to waveguides 700*a-b* described with respect to FIGS. 7A and 7B. Similarly, substrate 950 can be considered analogous to substrates 750*a-b* and DOE 960 can be considered analogous to any of DOEs 760*a-b*, 762*a-b*, 764*b*, and 766*b* as described with respect to FIGS. 7A and 7B. In some embodiments, the substrate 950 of waveguide 900 is formed of a material that allows for light propagation through total internal reflection, for example glass. The diffraction grating structure 960 can be formed on the surface of substrate 950 of a different material (e.g. UV-curable polymer resin), can be etched into the surface of the substrate, or can be formed as part of the substrate (e.g. through injection molding or hot embossing).

FIG. 9 illustrates how a diffraction grating structure can vary across an area of a DOE. As shown in FIG. 9, the grating structure DOE 960 includes one or more physical parameters such as grating period P, grating line width W, grating fill factor F, grating depth D, slant angle φ, line shape (not shown), surface pattern (not shown) and modulation direction (not shown). The grating fill factor F is the fraction of the grating period that is filled with grating material. In other words, fill factor F=W/P. Note that the grating structure of DOE 960 shown in FIG. 9 is simplified and exaggerated for illustrative purposes, the actual dimensions and physical characteristics are not intended to be limiting. Depending on the application, a person having ordinary skill will understand how to adjust the various parameters across the area of the DOE to optimize the DOE for use as an in-coupler or our-coupler for a waveguide display of a NED device.

Figure 10:
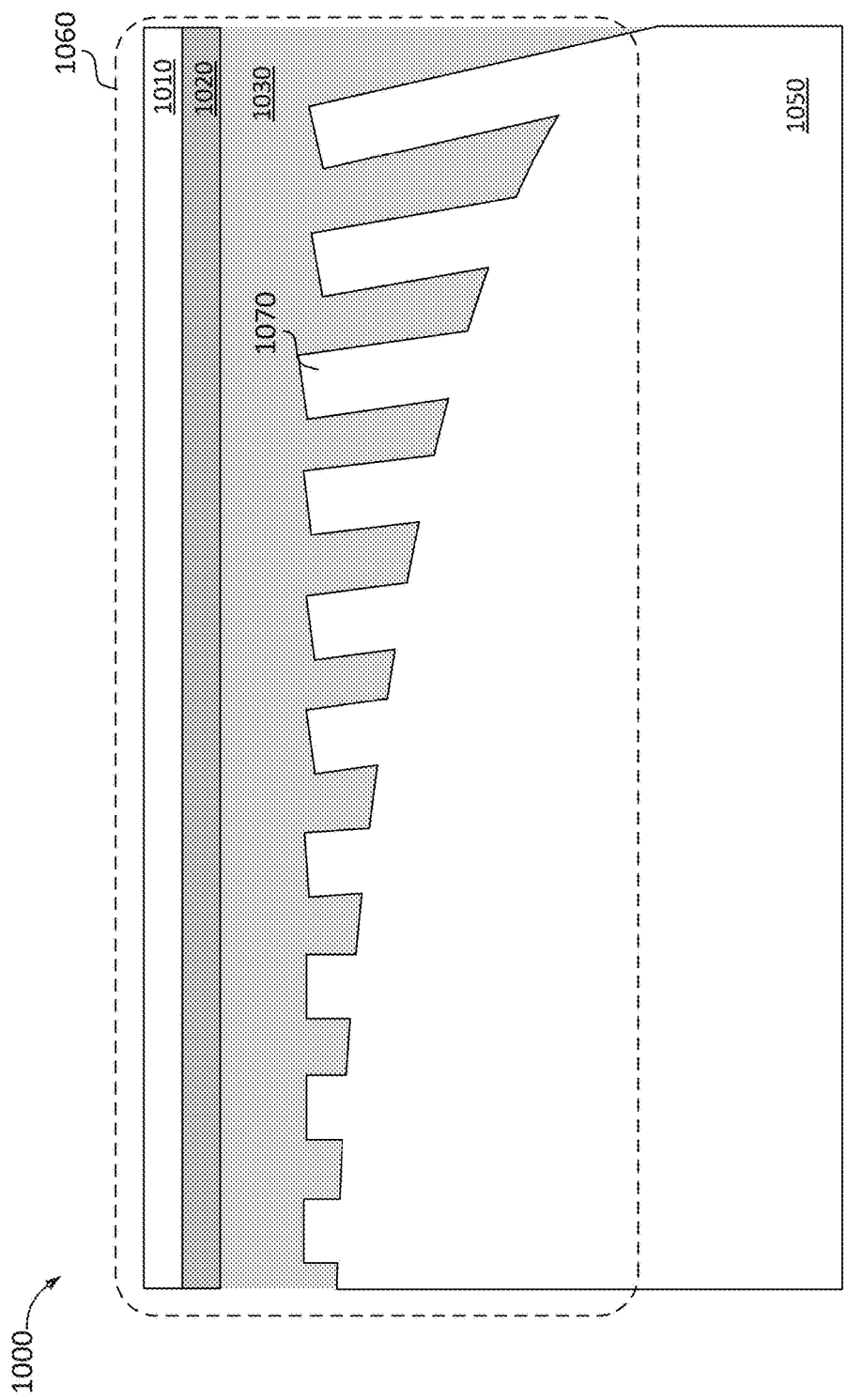
FIG. 10 shows a cross-sectional view of an example waveguide with a switchable DOE that includes surface diffraction gratings with varying structure, according to a first embodiment.

FIG. 10 shows a cross-sectional view of an example waveguide 1000 with a switchable DOE 1060 that includes surface diffraction gratings with varying structure, according to a first embodiment. Here, waveguide 1000 can be considered analogous to waveguides 700*a-b* described with respect to FIGS. 7A and 7B. Similarly, substrate 1050 can be considered analogous to substrates 750*a-b* and DOE 1060 can be considered analogous to any of DOEs 760a-b, 762a-b, 764b, and 766b as described with respect to FIGS. 7A and 7B.

As shown in FIG. 10, DOE 1060 includes an SRG structure 1070 that like the grating structure shown with respect to DOE 960 in FIG. 9 varies in one or more physical parameters over the area of DOE 1060. As previously discussed, these parameters can include, but are not limited to grating period, grating line width, grating fill factor, grating depth, slant angle, line shape, surface pattern, and modulation direction. In some embodiments the variation in these one or more parameters over the area of the DOE provides the design freedom to create a DOE that provides for arbitrary or near arbitrary analog modulation of light waves that it in-couples or out-couples. In other words, at any given point along its area, the DOE can exhibit diffractive properties that differ from another point. This high degree of freedom in shaping the diffraction grating structure over the area of the DOE allows for optimization of the DOE for use with a waveguide display of a NED device.

Substrate 1050 can be formed of a material that allows for light propagation through total internal reflection, for example glass. The diffraction grating structure 1070 of DOE 1060 can be formed on the surface of substrate 1050 of a different material (e.g. a UV-curable polymer resin), can be etched into the surface of the substrate, or can be formed as part of the substrate (e.g. through injection molding). For example, in some embodiments a master mold for the grating structure is manufactured using a precise etching process such as reactive ion beam etching (RIBE). An etching process such as RIBE allows for the formation of the desired modulations in the physical parameters of the diffraction grating structures which generally have dimensions on the order of several nanometers. For mass production, the SRG can be replicated based on the master mold using standard wafer level replication processes. As mentioned, the desired variations in the diffraction grating structure will depend on the intended use of the waveguide. Any number of standard manufacturing processes can be applied that are capable of forming the diffraction grating nanostructures.

To allow for switching between a diffractive state and a transparent state, DOE 1070 also includes a layer of liquid crystal material 1030 that at least fills in the interstitial spaces of the diffraction grating structure 1070. In some embodiments, the liquid crystal material is applied to fill in the diffraction grating structure 1070 through a process of spin coating. Above the layer of liquid crystal material is a layer 1010 of transparent electrical insulator material (e.g. glass) with a layer 1020 of electrically conductive material (e.g. ITO) through which electrical signals are transferred to the liquid crystal material to switch states.

Switching by DOE 1060 between a diffractive state and transparent state occurs in much the same way as waveguide 800 described with respect to FIG. 8. That is, where no electrical field is applied the liquid crystal droplets in layer 1030 form fringe planes that define a diffraction grating structure. During operation of a waveguide display, an electric field applied to the grating via transparent electrode layer 1030 that causes the liquid crystal droplets in the layer 1030 to reorient such that the refractive index of the fringe planes is reduced. This causes the grating diffraction efficiency to drop to very low levels, and the 1030 to appear transparent. Conversely, DOE 1060 can also be engineered to work in reverse mode, i.e. to switch to a diffractive state when the voltage is applied.

In some embodiments, liquid crystal layer 1030 does not include regions of polymerized material, unlike HPLD layer 830 described with respect to FIG. 8. This is because switchable grating structures formed by the liquid crystal droplets are constrained by the interstitial space between the SRG structures 1070. The lack of polymerized material in layer 1030 has the added benefit of reducing the operating voltages required to switch between states to below 1 V. Reduced operating voltage is particularly useful in the context of a mobile NED device. Further, since the liquid crystal material of layer 1030 sits between the replicated SRG structure 1060 and not regions of polymerized material, the time consuming holography process described with respect to FIG. 8 for causing the phase separation may no longer be required.

Note that the structural elements of waveguide 1000 are illustrated conceptually in FIG. 10 and are not intended to show liming structural configurations or dimensions. For example the dimensions of the diffraction grating structure 1070 are greatly exaggerated relative to the dimensions of substrate 1050 and layers 1010, 120, and 1030 for clarity purposes. For example, in reality, the diffraction grating lines would likely have a depth D that is on the order of 50-500 nm, while the glass layer 1010 and ITO coating layer 1020 would have a thickness that is on the order of 100 to 200 μm. Similarly, the number, shape, and orientation of diffraction grating lines of DOE 1060 are intended to be illustrative and not limiting.

Figure 11:
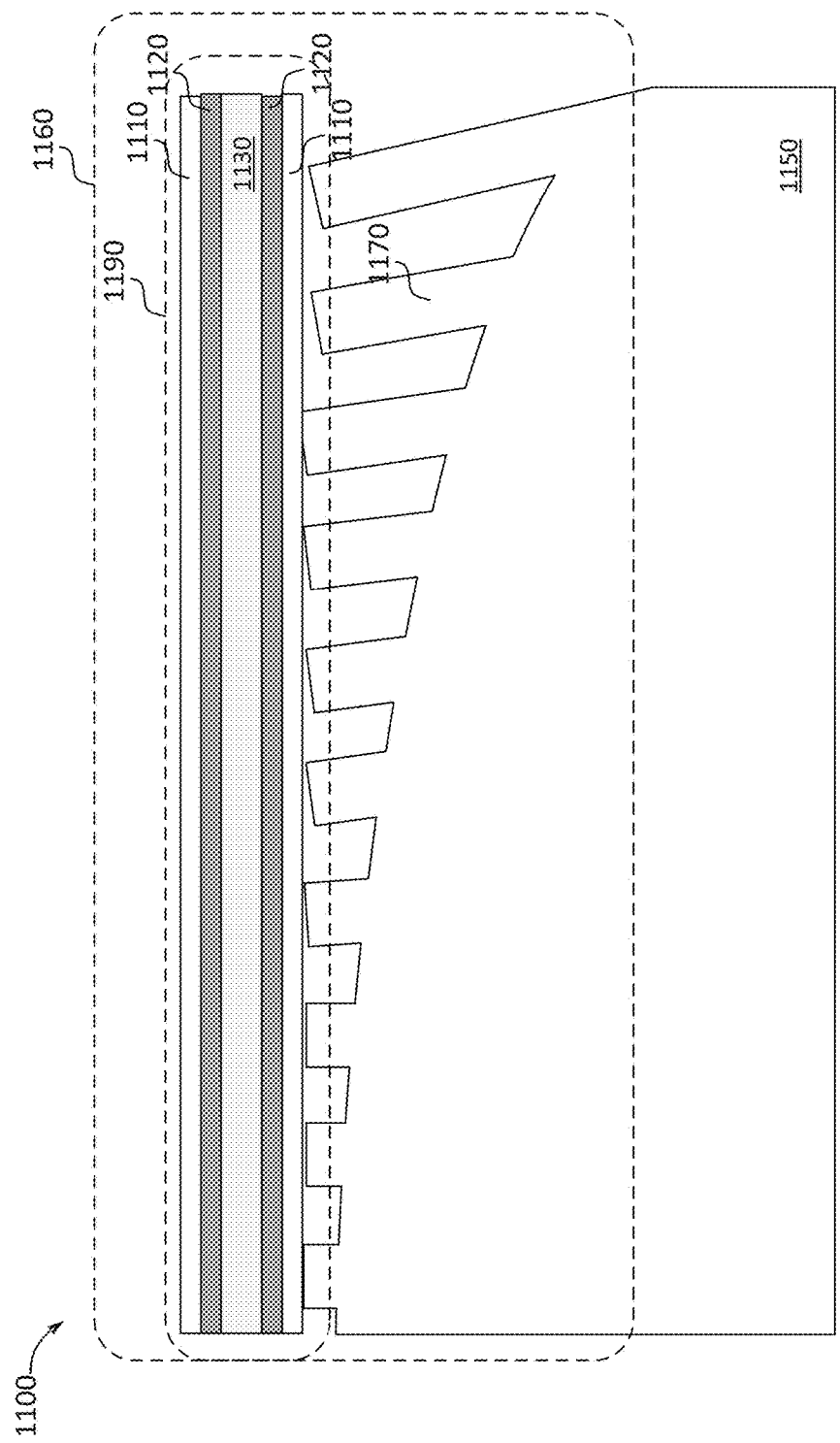
FIG. 11 shows a cross-sectional view of an example waveguide with a switchable DOE that includes surface diffraction gratings with varying structure, according to a second embodiment.

FIG. 11 shows a cross-sectional view of an example waveguide 1100 with a switchable DOE 1160 that includes surface diffraction gratings with varying structure, according to a first embodiment. Here, waveguide 1100 can be considered analogous to waveguides 700a-b described with respect to FIGS. 7A and 7B. Similarly, substrate 1150 can be considered analogous to substrates 750a-b and DOE 1160 can be considered analogous to any of DOEs 760a-b, 762a-b, 764b, and 766b as described with respect to FIGS. 7A and 7B.

As shown in FIG. 11, DOE 1160 includes an SRG structure 1170 that like the grating structure shown with respect to DOE 1060 in FIG. 10 varies in one or more physical parameters over the area of DOE 1160. However, DOE 1160 differs from DOE 1060, in that DOE 1160 includes a discrete SBG 1190 overlaid over the SRG structure 1170. SBG 1190 includes two layers 1110 of insulating material (e.g. glass), two layers 1120 of electrically conductive material (e.g. ITO), and a layer 830 of HPDLC mixture. SBG 1190 can be considered analogous to DOE 800 described with respect to FIG. 8.

Figure 12:
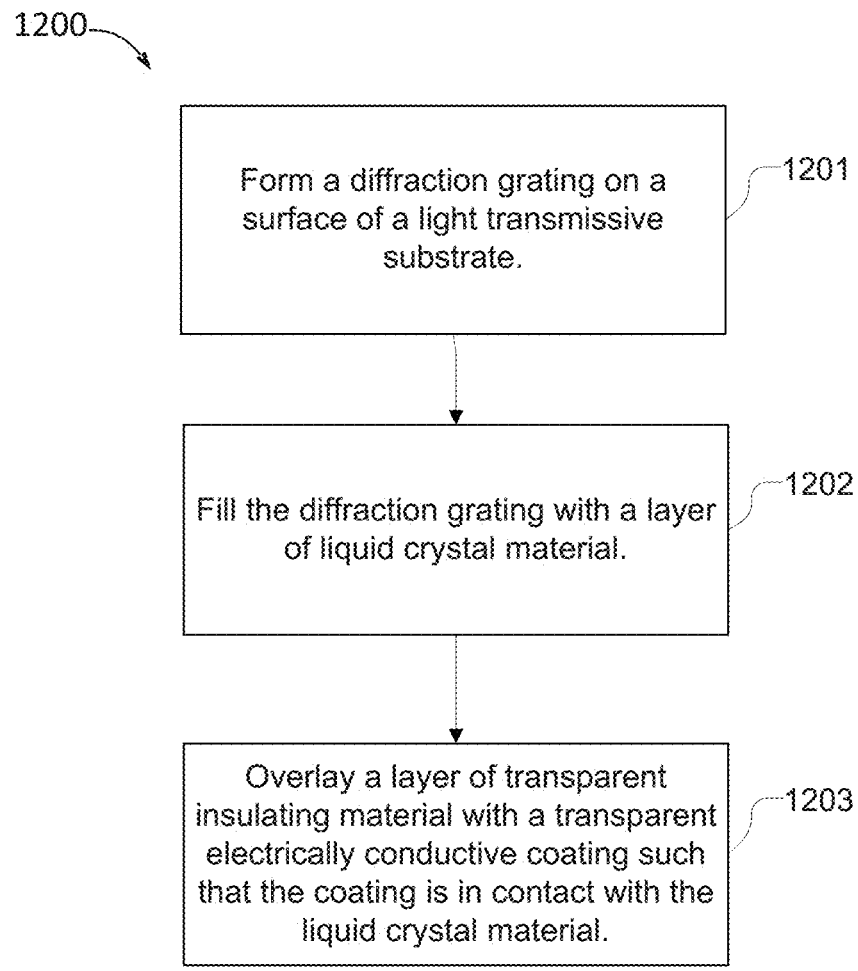
FIG. 12 is a flow chart of an example process for manufacturing a waveguide with a switchable DOE that includes surface diffraction gratings with varying structure.

FIG. 12 is a flow chart of an example process 1200 for manufacturing a waveguide with a switchable DOE that includes surface diffraction gratings with varying structure. Process 1200 begins at step 1201 with forming an SRG (e.g. made of UV curable polymer-based resin) on a surface of a light transmissive substrate (e.g. made of glass). In some embodiments the SRG is formed using a replication process based on a master mold originally manufactured using precision etching (e.g. reactive ion beam etching). The process continues at step 1202 with filling the SRG with a layer of liquid crystal material. The process continues at step 1203 with overlaying a layer of transparent insulating material (e.g. glass) with a transparent electrically coating (e.g. ITO) such that the coating is in contact with the liquid crystal material.

EXAMPLES OF CERTAIN EMBODIMENTS

Certain embodiments of the technology introduced herein are summarized in the following numbered examples:

1. An optical waveguide including: a light-transmissive substrate configured for use in a near-eye display (NED) device, the substrate including a plurality of internally reflective surfaces configured to propagate light rays through internal reflection; and a switchable diffractive optical element (DOE) on a first surface of the plurality of surfaces of the substrate, the switchable DOE configured to input light rays to the substrate or output light rays from the substrate, the switchable DOE having diffractive properties that vary across an area of the switchable DOE.

2. The optical waveguide of example 1, wherein the switchable DOE includes: a surface relief diffraction grating (SRG) on the first surface of the substrate; and a Switchable Bragg Gating (SBG) overlaid on the SRG, the SBG configured to be electronically switchable between a transparent state and a diffractive state.

3. The optical waveguide of example 1 or example 2, wherein the diffractive properties include diffraction efficiency.

4. The optical waveguide of example 2 or example 3, wherein the SRG has a diffraction grating structure that varies in at least one parameter across the area of the DOE.

5. The optical waveguide of example 4, wherein the at least one parameter includes one or more of: linewidth, period, depth, modulation direction, slant angle or line shape.

6. The optical waveguide of example 4 or example 5, wherein the variation in the diffractive properties of the switchable DOE is based on the variation in the at least one parameter of the diffraction grating structure of the SRG across the area of the switchable DOE.

7. The optical waveguide of any of examples 1 through 6, wherein the switchable DOE includes: a surface relief diffraction grating (SRG) on the first surface of the substrate; a layer of liquid crystal material in contact with the SRG, the liquid crystal material configured to switch between a transparent state and a diffractive state in response to an applied voltage; a layer of conducting material in contact with the liquid crystal material configured to apply the voltage to the liquid crystal material; and a layer of insulating material over the layer of conducting material.

8. The optical waveguide of example 7, wherein the SRG is embedded in the layer of liquid crystal material.

9. The optical waveguide of example 7 or example 8, wherein the layer of conducting material includes indium tin oxide (ITO).

10. The optical waveguide of any of examples 7 through 9, wherein the layer of insulating material includes glass.

11. The optical waveguide of any of examples 2 through 10, wherein the SRG is etched into the substrate.

12. The optical waveguide of any of examples 2 through 10, wherein the SRG is formed on the substrate.

13. The optical waveguide of any of examples 1 through 12, wherein the switchable DOE is an in-coupling element configured to input light rays received from an image generator of a near-eye display device into the substrate.

14. The optical waveguide of any of examples 1 through 12, wherein the switchable DOE is an out-coupling element configured to output light rays from the substrate and to direct the light rays towards an eye of a user of a near-eye display device.

15. The optical waveguide of any of examples 1 through 14, wherein the substrate includes glass.

16. The optical waveguide of any of examples 1 through 15, further including a second switchable DOE; wherein the switchable DOE is configured to input or output light rays collectively representing a first segment of an overall field of view (FOV) of a particular eye of a user of the NED device; and wherein the second switchable DOE is configured to input or output light rays collectively representing a second segment of the overall FOV of the NED device.

17. A near-eye display device including: a light-emitting microdisplay imager configured to emit light rays collectively representing a generated image; and a waveguide display, the waveguide display including: a light-transmissive substrate including a plurality of internally reflective surfaces configured to propagate light rays through internal reflection; an in-coupling element configured to input light rays from the microdisplay imager into the substrate; and an out-coupling element configured to output propagated light rays from the substrate and to direct the light rays to an eye of a user of the near-eye display device, wherein both the in-coupling element and out-coupling element include a switchable diffractive optical element (DOE) on at least a portion of a first surface of the plurality of surfaces of the substrate, the switchable DOE configured to switch between a passive transparent state and an active diffractive state, and wherein the diffractive properties of the switchable DOE vary across an area of the switchable DOE 18. A method of manufacturing a waveguide including: forming a diffraction grating on a surface of a light transmissive substrate, the light transmissive substrate configured to propagate light rays through internal reflection, the diffraction grating having one or more physical parameters that vary over an area of the diffraction grating; filling the diffraction grating with a layer of liquid crystal material; and overlaying a layer of transparent insulating material with a transparent electrically conductive coating such that the coating is in contact with the liquid crystal material.

19. The method of manufacturing a waveguide of example 18, wherein the diffraction grating is formed using a replication process based on a master mold originally manufactured using reactive ion beam etching (RIBE).

20. The method of manufacturing a waveguide of example 18 or example 19, wherein filling the diffraction grating with a layer of liquid crystal material includes spin coating the diffraction grating with liquid crystal material.

21. A system configured to manufacture a waveguide including: means for forming a diffraction grating on a surface of a light transmissive substrate, the light transmissive substrate configured to propagate light rays through internal reflection, the diffraction grating having one or more physical parameters that vary over an area of the diffraction grating; means for filling the diffraction grating with a layer of liquid crystal material; and means for overlaying a layer of transparent insulating material with a transparent electrically conductive coating such that the coating is in contact with the liquid crystal material.

22. The system of example 21, wherein the means for forming the diffraction grating include means for replicating the diffraction grating based on a master mold.

23. The system of example 21 or example 22, wherein the means for filling the diffraction grating with a layer of liquid crystal material includes means for spin coating the diffraction grating with liquid crystal material.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An optical waveguide comprising:
   a light-transmissive substrate configured for use in a near-eye display (NED) device, the substrate including a plurality of internally reflective surfaces configured to propagate light rays through internal reflection; and
   a switchable diffractive optical element (DOE) on a first surface of the plurality of surfaces of the substrate, the switchable DOE configured to input light rays to the substrate or output light rays from the substrate, the switchable DOE having diffractive properties that vary across an area of the switchable DOE;
   wherein the switchable DOE includes:
      a surface relief diffraction grating (SRG) on the first surface of the substrate; and
      a Switchable Bragg Gating (SBG) overlaid on the SRG, the SBG configured to be electronically switchable between a transparent state and a diffractive state.

2. The optical waveguide of claim 1, wherein the diffractive properties include diffraction efficiency.

3. The optical waveguide of claim 1, wherein the SRG has a diffraction grating structure that varies in at least one parameter across the area of the DOE.

4. The optical waveguide of claim 3, wherein the at least one parameter includes one or more of: linewidth, period, depth, modulation direction, slant angle or line shape.

5. The optical waveguide of claim 3, wherein the variation in the diffractive properties of the switchable DOE is based on the variation in the at least one parameter of the diffraction grating structure of the SRG across the area of the switchable DOE.

6. The optical waveguide of claim 1, wherein the switchable DOE further includes:
   a layer of liquid crystal material in contact with the SRG, the liquid crystal material configured to switch between a transparent state and a diffractive state in response to an applied voltage;
   a layer of conducting material in contact with the liquid crystal material configured to apply the voltage to the liquid crystal material; and
   a layer of insulating material over the layer of conducting material.

7. The optical waveguide of claim 6, wherein the SRG is embedded in the layer of liquid crystal material.

8. The optical waveguide of claim 6, wherein the layer of conducting material comprises indium tin oxide (ITO).

9. The optical waveguide of claim 6, wherein the layer of insulating material comprises glass.

10. The optical waveguide of claim 1, wherein the SRG is etched into the substrate.

11. The optical waveguide of claim 1, wherein the SRG is formed on the substrate.

12. The optical waveguide of claim 1, wherein the switchable DOE is an in-coupling element configured to input light rays received from an image generator of a near-eye display device into the substrate.

13. The optical waveguide of claim 1, wherein the switchable DOE is an out-coupling element configured to output light rays from the substrate and to direct the light rays towards an eye of a user of a near-eye display device.

14. The optical waveguide of claim 1, wherein the substrate comprises glass.

15. The optical waveguide of claim 1, further comprising a second switchable DOE;
   wherein the switchable DOE is configured to input or output light rays collectively representing a first segment of an overall field of view (FOV) of a particular eye of a user of the NED device; and
   wherein the second switchable DOE is configured to input or output light rays collectively representing a second segment of the overall FOV of the NED device.

16. A near-eye display device comprising:
   a light-emitting microdisplay imager configured to emit light rays collectively representing a generated image; and
   a waveguide display including:
      a light-transmissive substrate including a plurality of internally reflective surfaces configured to propagate light rays through internal reflection;
      an in-coupling element configured to input light rays from the microdisplay imager into the substrate; and
      an out-coupling element configured to output propagated light rays from the substrate and to direct the light rays to an eye of a user of the near-eye display device;
      wherein both the in-coupling element and out-coupling element include a switchable diffractive optical element (DOE) on at least a portion of a first surface of the plurality of surfaces of the substrate, the switchable DOE configured to switch between a passive transparent state and an active diffractive state, wherein the diffractive properties of the switchable DOE vary across an area of the switchable DOE.

17. A method of manufacturing a waveguide comprising:
   forming a diffraction grating on a surface of a light transmissive substrate, the light transmissive substrate configured to propagate light rays through internal reflection, the diffraction grating having one or more physical parameters that vary over an area of the diffraction grating;
   filling the diffraction grating with a layer of liquid crystal material; and
   overlaying a layer of transparent insulating material with a transparent electrically conductive coating such that the coating is in contact with the liquid crystal material.

18. The method of manufacturing a waveguide of claim 17, wherein the diffraction grating is formed using a replication process based on a master mold originally manufactured using reactive ion beam etching (RIBE).

19. The method of manufacturing a waveguide of claim 17, wherein filling the diffraction grating with a layer of liquid crystal material includes spin coating the diffraction grating with liquid crystal material.

20. An optical waveguide comprising:
   a light-transmissive substrate configured for use in a near-eye display (NED) device, the substrate including a plurality of internally reflective surfaces configured to propagate light rays through internal reflection; and
   a switchable diffractive optical element (DOE) on a first surface of the plurality of surfaces of the substrate, the switchable DOE configured to input light rays to the substrate or output light rays from the substrate, the switchable DOE having diffractive properties that vary across an area of the switchable DOE;
wherein the switchable DOE includes:
- a surface relief diffraction grating (SRG) on the first surface of the substrate;
- a layer of liquid crystal material in contact with the SRG, the liquid crystal material configured to switch between a transparent state and a diffractive state in response to an applied voltage;
- a layer of conducting material in contact with the liquid crystal material configured to apply the voltage to the liquid crystal material; and
- a layer of insulating material over the layer of conducting material.

21. An optical waveguide comprising:
- a light-transmissive substrate configured for use in a near-eye display (NED) device, the substrate including a plurality of internally reflective surfaces configured to propagate light rays through internal reflection;
- a first switchable diffractive optical element (DOE) on a first surface of the plurality of surfaces of the substrate, the first switchable DOE configured to input light rays to the substrate or output light rays from the substrate collectively representing a first segment of an overall field of view (FOV) of a particular eye of a user of the NED device, the first switchable DOE having diffractive properties that vary across an area of the first switchable DOE; and
- a second switchable DOE, the second switchable DOE configured to input light rays to the substrate or output light rays from the substrate collectively representing a second segment of the overall field of view (FOV) of the particular eye of the user of the NED device, the second switchable DOE having diffractive properties that vary across the area of the second switchable DOE.

* * * * *